Figure 1:
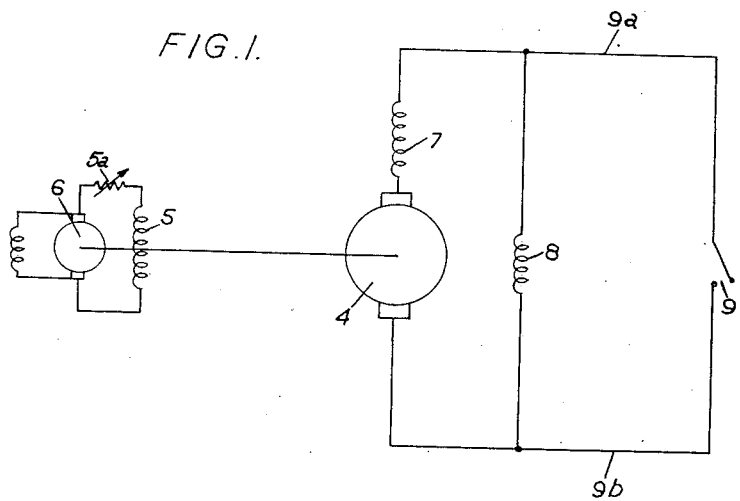

July 6, 1954   J. C. MACFARLANE ET AL   2,683,231
DIRECT CURRENT ELECTRICITY GENERATOR
Filed May 8, 1952                                                  4 Sheets-Sheet 1

James Colquhoun Macfarlane
James Wright Macfarlane
William Ian Macfarlane
Charles Crichton Macfarlane
Inventors By Richardson, David and Norden
their Attorney Patented July 6, 1954

2,683,231

UNITED STATES PATENT OFFICE 2,683,231

DIRECT CURRENT ELECTRICITY GENERATOR

James C. Macfarlane, James Wright Macfarlane, and William Ian Macfarlane, Cathcart, Glasgow, and Charles Crichton Macfarlane, Eaglesham, Scotland Application May 8, 1952, Serial No. 286,754

6 Claims. (Cl. 310—184)

This invention relates to direct current electricity generators of the inter-pole type capable of use for the supply of variable electric-welding current, especially for arc welding.

Provision is often made in direct current electricity generators in general for regulating the position of the brushes relative to the main field, so that they may be adjusted to the optimum positions for sparkless commutation under different running conditions.

In direct current electricity generators of the type stated having differential series coils and with main fields excited from separate constant potential sources as hitherto in use, it has been believed necessary to provide variable inductive divertors to handle the large currents required for direct current welding and at the same time provide the wide and continuous control necessary to obtain full advantage of the system throughout the whole current range, which is seldom less than a total of 10/1 and is sometimes as great as 20/1. However, by using diversion control alone, the current range obtainable is seldom more than 4/1. That is to say, in order to obtain an overall range of 20/1, other devices must be used in combination with series divertors; for example, the main field excitation may be made variable.

An object of the present invention is to provide a direct current electricity generator especially suitable for welding purposes.

The present invention is a direct current electricity generator of the type stated in which the field pole structure comprises a plurality of components constituting the main pole and the interpoles, the main-pole components being embraced by separately excited windings angularly offset in the direction of armature motion to produce a correspondingly offset field, and the inter pole components having series windings embracing also the adjacent main-pole components, and in which the commutator has brushes on a support having mechanism for adjusting the support to move the brushes in the direction of armature motion to regulate the series opposition magneto-motive-force due to armature reaction.

Preferably the components of each main pole are embraced additionally by an auxiliary field winding whose central axis coincides with the main polar axis, in order to provide a small magneto motive-force which is effective within part of the brush-shift regions.

Preferably said auxiliary field winding is in parallel with the output of the generator.

By virtue of this field winding arrangement, the flux density in the airgap under the partly wound leading polar tooth or teeth is limited to a value low enough to allow the brushes to be moved not only under the interpole but also under said tooth or teeth without undue sparking between the brushes and commutator segments. Moreover, by correctly proportioning the auxiliary field winding and the series winding which embraces the interpole components and adjacent main-pole components, the resultant variation of magneto-motive force under the leading polar tooth or teeth with change in welding load current influences the armature coils undergoing commutation, and induces currents in said coils thereby improving the transient response to said changes in load-current.

As welding generators are often driven by diesel engines and are liable to rough usage, it is necessary for all parts to be of robust construction and easily maintained.

Brush moving apparatus such as hitherto known is designed merely for occasional adjustment, and therefore they have small bearing surfaces and no provision for adequate lubrication. In contradistinction, brush moving apparatus which must be more or less continually in use on a generator according to the present invention must be designed with as large and well-lubricated bearing surfaces as practicable.

Thus, the mechanism for adjustment of the brush support preferably comprises an annular brush-carrying support which is rotatable on bearings co-axial with the generator shaft and which has bevel teeth engaged by a turnable bevel pinion that is pressed firmly into mesh with said teeth.

Provision may be made for adjusting the firmness with which the pinion is pressed into mesh.

Figure 2:
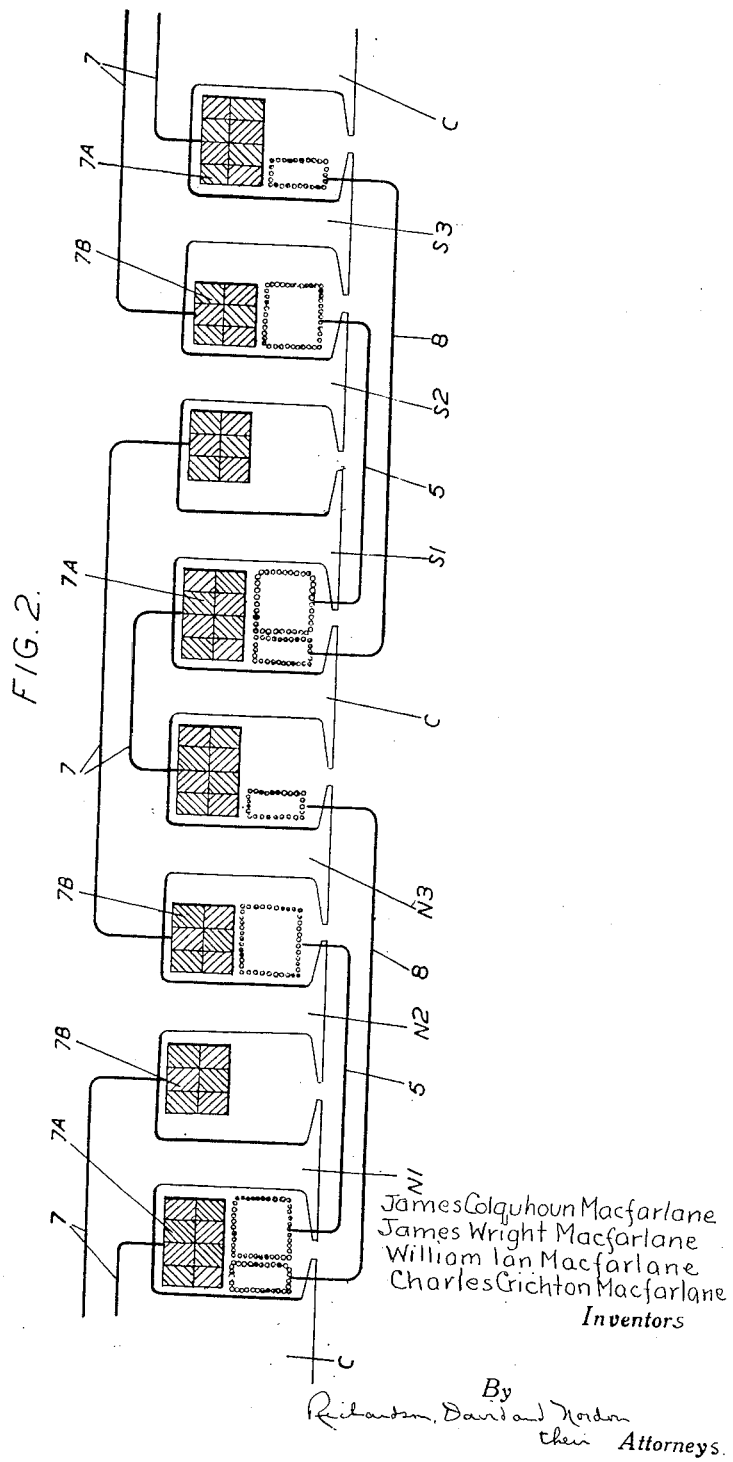
Figure 3:
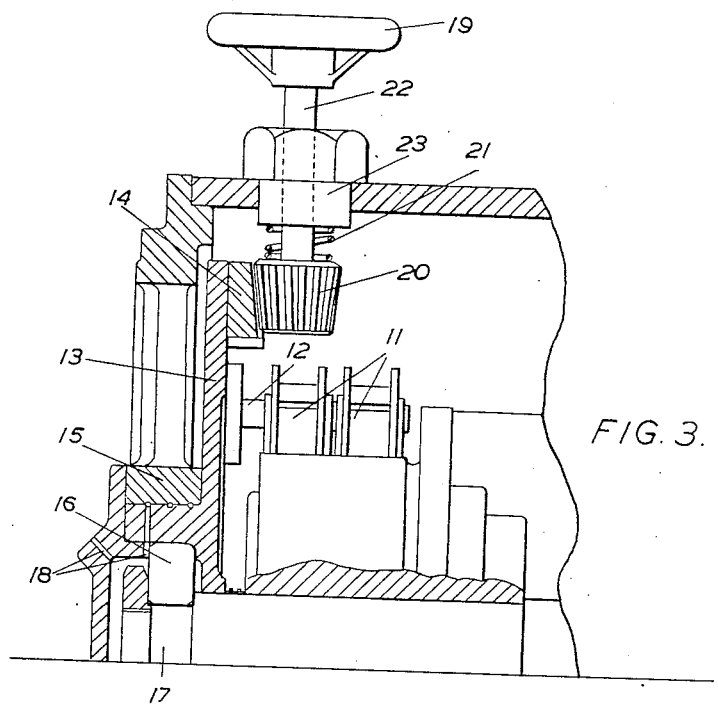
Figure 4:
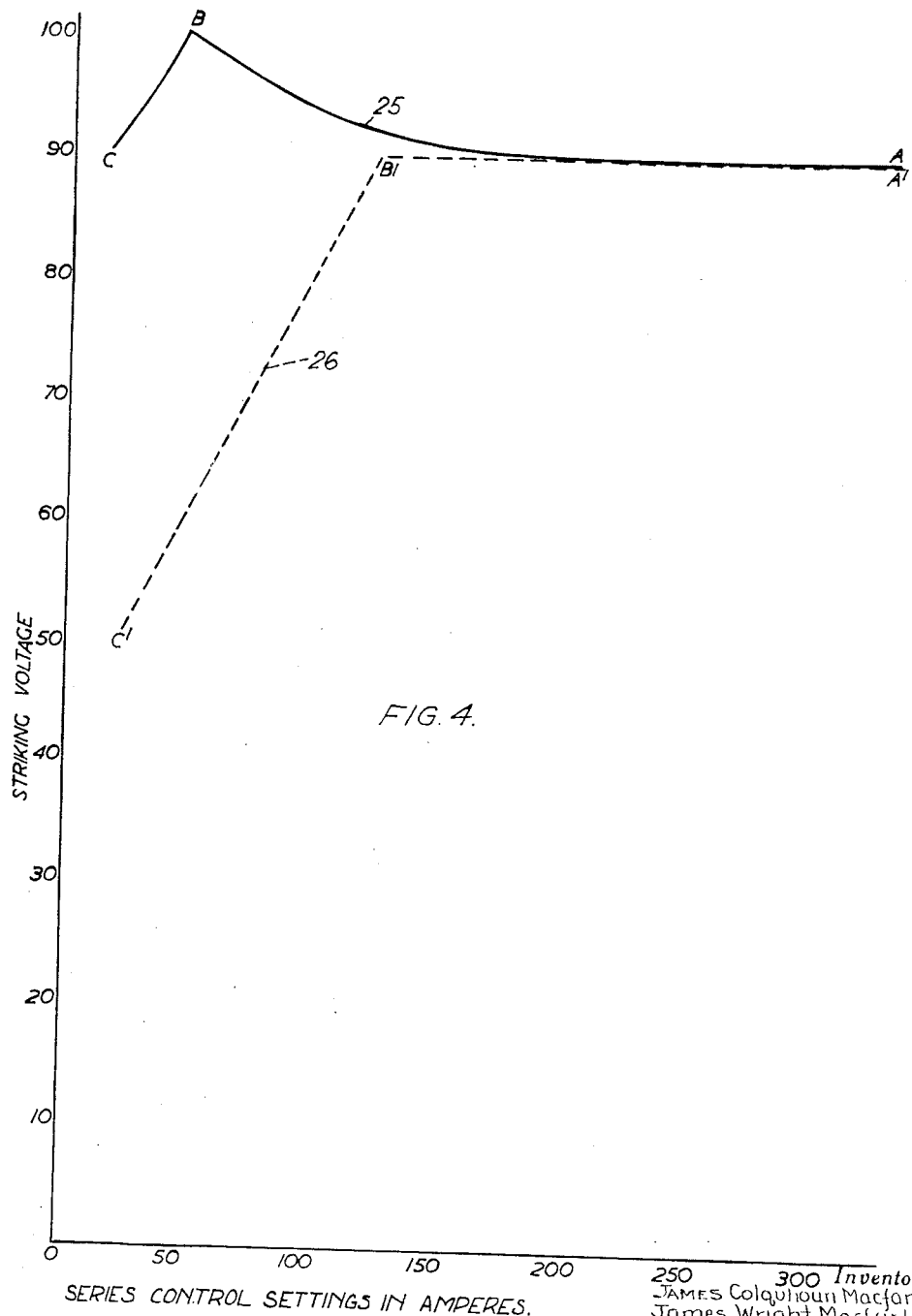

An embodiment of the present invention will now be described, by way of example, with reference to the accompanying drawings in which Fig. 1 is a diagram of the circuit, Fig. 2 is a diagram of the field windings, Fig. 3 is a sectional elevation of the movable brush gear assembly, and Fig. 4 is a graph of both the open-circuit characteristic of a generator according to the invention and that of a typical existing welding generator.

The generator to be described is of four-pole construction, being illustrative of the invention in its simplest form.

The field windings are symmetrical, and therefore for clarity the windings are shown applied to two consecutive poles only.

Referring to Fig. 1, the welding generator 4 has a main winding 5 which is separately excited by a shunt exciter 6 via a field regulator 5a. This exciter is coupled mechanically to the generator 4. A compensating field winding 7 is connected in series with the armature of the generator 4, and a small auxiliary self-excited field winding 8 is shunted across the armature-and-winding combination. Welding current is carried to the arc 9 by two heavy conductors 9a and 9b.

Referring to Fig. 2, the stator is slotted to provide four teeth per pole. Three teeth N1, N2 and N3 constitute a north, three teeth S1, S2 and S3 constitute a south pole and the intervening teeth C act as interpoles. It will be seen that the teeth N2 and S2 are on the polar axis. One of the main field windings 5 embraces the teeth N1 and N2 only and the other winding 5 shown embraces the other teeth S1 and S2 only. Thus, as the teeth N2 and S2 are on the polar axis and the other teeth N1 and S1 are offset in the direction of armature motion, that is to say as they are trailing teeth, the resulting magneto-motive-force will be correspondingly offset in the direction of armature motion, that is to say to the lagging side of the main polar axis.

The small auxiliary winding 8 is of conventional type and embraces all three teeth of each main pole coaxially therewith, that is to say it embraces also the leading teeth N3 and S3.

The compensating winding 7 is of concentric coil construction, consisting of two coils per pole, the inner coil 7A embracing the tooth C only and the outer coil 7B spanning three teeth, so that the axis of magnetisation of the winding 7 coincides with the neutral axis. The sum of the magneto-motive-forces of these coils opposes the armature reaction and is sufficiently strong to ensure sparkless commutation at any brush position from the neutral axis through an angle of about 11° in the direction of armature motion, that is to the trailing tip of the teeth C.

Referring to Fig. 3, the brushes 11 are mounted on carrying arms 12 which are rigidly attached to a circular rocker 13 having a ring or segment of gear teeth 14. The rocker 13 is interposed between the hub 15 of the generator casing and the outer side of a ball bearing 16, which carries the generator shaft 17. By virtue of this construction, the surfaces on which the rocker can be rotated may be designed of a suitable magnitude and the sliding surfaces may be lubricated adequately through holes 18 leading to and from the ball bearing.

The brush-gear is adjusted by means of a handwheel 19 which is connected to a bevel pinion 20 engaging teeth 14. A spring 21 pressing the pinion radially inwards ensures good contact between the teeth and prevents chattering during running. The pinion shaft 22 is borne by an eccentric bush 23. By turning this bush, the pinion 20 can be adjusted tightly in position against the teeth 14.

The handwheel 19 may be used in conjunction with a dial calibrated in units of electric current. Such a dial may be provided with a plurality of scales, for example ten, one for use at the normal value of excitation of the field and the others for use at different settings of the variable field resistance or regulator 5a put in series with the main field winding 5.

Thus a voltage range is provided, ranging from high voltage with no resistance 5a in series with the main field winding 5, to low voltage with maximum resistance 5a in series with said winding 5.

Referring to Fig. 4, 25 is a characteristic curve of open circuit or striking voltage to a base of series control settings in amperes for a welding generator according to the present invention, while 26 is a corresponding curve to 25 for a typical existing generator.

The portion A to B of curve 25 shows the increase in striking voltage obtainable with variation from high to lower values of welding current, at maximum setting of the field regulator 5a, by moving the commutator brushes 11 to vary the series opposition magneto-motive-force due to armature reaction. The increase of voltage which occurs at the lower settings of the series brush control, that is to say, while the brushes 11 are under the leading tips of the teeth N3 and S3, is due to the resultant main-pole magnetising effect of armature coils short-circuited by the brushes 11 when undergoing commutation. The lower current values, corresponding to the portion B to C of the curve 25, are obtainable by progressively increasing the resistance 5a in series with the main field winding 5, with the brushes 11 set in the minimum-current series control setting, that is the portion B to C of the curve 25 shows the corresponding variation in striking voltage with welding current obtainable at welding currents below those obtainable at the minimum current setting of the brush control.

In use of the welder, the field regulator 5a is first set to the desired voltage position, and the handwheel 19 is then set to the required current on the dial scale which corresponds to the setting of the field regulator 5a.

Thus the required striking voltage and current may be positively preselected by use of two controls. This removes the necessity for measuring instruments except for checking purposes.

The portion A1 to B1 of the curve 26 shows the variation in striking voltage with welding current obtainable in a high current range of an existing welding generator by series diversion control, while the portion B1 to C1 of the curve 26 shows the corresponding variation obtainable with variable main field excitation in this case.

The magneto-motive-force of the field winding 5 may be four to five times that of the auxiliary winding 8, thus providing the required full flux per pole and eliminating any tendency towards sparking at no load, but still leaving a small magneto-motive-force due to the electro-motive-force generated in the coils under commutation. Such small magneto-motive-force is desirable for the following reasons:

(1) The no-load terminal voltage at the lower current values increases towards the low-current end of the range of brush movement, i. e. approximately 22° on a four-pole generator.

(2) Transient response for small current welding is greatly improved.

This improved transient response at low values of welding current is due to the fact that the terminal voltage of the generator drops rapidly as the load is applied. This results in a corresponding drop in the magneto-motive-force set up by winding 8. Moreover the resulting armature-reaction magneto-motive-force as load is applied tends to demagnetise the leading pole teeth N3, S3.

When the generator terminals are short-circuited, the resultant of these two aforesaid effects is such as to reverse the leading pole tips and set up a negative magneto-motive-force in the main polar axis, due to currents induced in the armature coils short-circuited by the brushes 11 when undergoing commutation.

For example, in a typical machine according to the invention, the resultant magneto-motive-force influencing the coils undergoing commutation, is arranged to vary from +700 ampere turns at light load current to −500 ampere turns under short-circuit conditions.

In the example, the field winding arrangement is such that the angle of displacement of the brushes 11 can be so great that approximately 40% effective conductors per pole are demagnetised without reducing the open circuit voltage and without allowing sparking at the commutator under this condition.

Thus brush movement series control is available over a 12/1 range, and it is possible with the two controls, in use, to weld through a current range of over 30/1 without the open circuit electro-motive-force falling below 90 volts.

Moreover, the recovery time of a generator according to the present invention, under similar test conditions, is about one fourth that of a typical welding generator of recent design. This is an important point. Recent tests have shown that when welding at or near the minimum critical arc voltage, the value of which depends largely on the speed of recovery of the generator, the rate of metal deposition, penetration, and the power efficiency are greatly increased.

Tests have been carried out recently with direct current single operator generators according to the invention which show that steady welding at an arc electro-motive-force below 15 volts is possible, and the lower the arc voltage it is possible to maintain, the greater the above increases.

Parallelling two generators for larger output consists simply in setting the open circuit voltages of each to a desired value, selecting the current values of each, the sum of which when parallelled, will equal the desired total load, and connecting in parallel the output terminals of the two generators by a switching arrangement or similar means. The currents shared may, but need not necessarily, be of equal magnitude.

The description aforesaid has been based on the simplest case, i. e. four stator slots per pole, but in large generators it may be desirable to increase the number of slots by subdividing each tooth into say two, three or any multiple of teeth giving eight, twelve, and so on, slots per pole and treating the subdivisions as independent teeth.

In this respect it should be noted that the use of a laminated construction for the generator field pole structure is necessary, owing to the relatively large angular brush movement.

The main field winding 5 may be excited from any convenient direct current source, other than a directly coupled exciter such as in the example.

The small auxiliary field winding 8 may be made variable by connecting a rheostat in series with it.

If welding current is available, generators according to the invention may be used (without modification) as starting motors for their engines.

We claim:

1. A direct current electricity generator of the interpole type, capable of use for the supply of variable electric-welding current, comprising a field pole structure including a plurality of components constituting the main poles and the inter-poles, an armature and commutator assembly, commutator brushes on inter-pole neutral axes, a support for the brushes, means for adjusting the support to move the brushes in the direction of armature motion in order to regulate the series opposition magneto-motive-force due to armature reaction, separately excited windings embracing main pole components of each pole with the central axis of the windings angularly offset from the main polar axis of the latter in the direction of armature motion to produce a correspondingly offset field, and series windings embracing both the inter pole components and the adjacent main-pole components.

2. A direct current electricity generator of the inter-pole type, capable of use for the supply of variable electric-welding current, comprising a field pole structure including a plurality of components constituting the main poles and the inter-poles, an armature and commutator assembly, commutator brushes on inter-pole neutral axes, a support for the brushes, means for adjusting the support to move the brushes in the direction of armature motion in order to regulate the series opposition magneto-motive-force due to armature reaction, series windings embracing both the inter-pole components and the adjacent main-pole components, and a separately excited winding and an auxiliary field winding embracing said main pole components, the central axis of the former winding being angularly offset from the main polar axis in the direction of armature motion to produce a correspondingly offset field, and the central axis of the latter winding coinciding with the main polar axis to provide a small magneto-motive-force which is also effective within part of the brush-shift region, the magneto-motive-forces resulting from said auxiliary field winding, from said series windings and due to armature reaction being proportioned to improve the transient response of the generator to changes in welding current.

3. A direct current electricity generator of the inter-pole type, capable of use for the supply of variable electric-welding current, comprising a field pole structure including a plurality of components constituting the main poles and the inter-poles, an armature and commutator assembly, commutator brushes on inter-pole neutral axes, a support for the brushes, means for adjusting the support to move the brushes in the direction of armature motion in order to regulate the series opposition magneto-motive-force due to armature reaction, series windings embracing both the inter-pole components and the adjacent main-pole components, and a winding separately excited from a source of variable direct current voltage and an auxiliary field winding in parallel with the generator output terminals both embracing said main pole components, the central axis of the former winding being angularly offset from the main polar axis in the direction of armature motion to produce a correspondingly offset field, and the central axis of the latter winding coinciding with the main polar axis to provide a small magneto-motive-force which is also effective within part of the brush region, the magneto-motive-forces resulting from said auxiliary field winding, from said series windings and due to armature reaction being proportioned to improve the transient response of the generator to changes in welding current.

4. A direct current electricity generator of the inter-pole type, capable of use for the supply of variable electric-welding current, comprising a field pole structure including a plurality of components constituting the main poles and the inter-poles, an armature and a commutator assembly, commutator brushes on inter-pole neutral axes, a support for the brushes, series windings embracing both the inter-pole components and the adjacent main-pole components, separately excited windings embracing main-pole components of each pole, these components being angularly offset from the main polar axis of the latter in the direction of armature motion to produce a correspondingly offset field, and means for adjusting the support to move the brushes in the direction of armature motion through an angle subtended by the inter-pole neutral axis and by the partly wound leading main-pole components, in order to regulate the series opposition magneto-motive-force due to armature reaction and so as to maintain the voltage output at low current settings of the brush control.

5. A direct current electricity generator of the inter-pole type, capable of use for the supply of variable electric-welding current, comprising a field pole structure including a plurality of components constituting the main poles and the inter-poles, an armature and commutator assembly, commutator brushes on inter-pole neutral axes, an annular support for the brushes which is rotatable on bearings co-axial with the generator shaft, bevel teeth on said support, a turntable bevel pinion meshing with said teeth for adjusting the support to move the brushes in the direction of armature motion in order to regulate the series opposition magneto-motive-force due to armature reaction, series windings embracing both the inter-pole components and the adjacent main-pole components, and separately excited windings embracing main pole components of each pole, these components being angularly offset from the main polar axis of the latter in the direction of armature motion to provide a correspondingly offset field.

6. A direct current electricity generator for the inter-pole type, capable of use for the supply of variable electric-welding current, comprising a field pole structure including a plurality of components constituting the main poles and the inter-poles, an armature and commutator assembly, commutator brushes on inter-pole neutral axes an annular support for the brushes which is rotatable on bearings co-axial with the generator shaft, bevel teeth on said support, a turntable bevel pinion, spring means for pressing said pinion firmly into mesh with said teeth for adjusting the support to move the brushes in the direction of armature motion in order to regulate the series opposition magneto-motive-force due to armature reaction, series windings embracing both the inter-pole component and the adjacent main-pole component, and separately excited windings embracing main pole components of each pole, these components being angularly offset from the main polar axis of the latter in the direction of armature motion to produce a correspondingly offset field.

References Cited in the file of this patent

UNITED STATES PATENTS

| Number | Name | Date |
| --- | --- | --- |
| 302,460 | Wood | July 22, 1884 |
| 2,102,761 | Strobel | Dec. 21, 1937 |